(12) United States Patent
Mathiske

(10) Patent No.: US 7,206,890 B2
(45) Date of Patent: Apr. 17, 2007

(54) SYSTEM AND METHOD FOR REDUCING ACCOUNTING OVERHEAD DURING MEMORY ALLOCATION

(75) Inventor: Bernd J. Mathiske, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 367 days.

(21) Appl. No.: 10/850,520

(22) Filed: May 19, 2004

(65) Prior Publication Data

US 2005/0262324 A1 Nov. 24, 2005

(51) Int. Cl.
*G06F 12/00* (2006.01)

(52) U.S. Cl. .............................. 711/6; 711/1; 711/100; 711/147; 711/154; 718/1; 718/100; 718/104

(58) Field of Classification Search .................... 711/1, 711/6, 100, 147, 154; 718/1, 100, 104
See application file for complete search history.

(56) References Cited

U.S. PATENT DOCUMENTS

| | | | | |
|---|---|---|---|---|
| 6,058,460 A | * | 5/2000 | Nakhimovsky | 711/153 |
| 6,230,220 B1 | * | 5/2001 | Cohen et al. | 710/52 |
| 6,839,725 B2 | * | 1/2005 | Agesen et al. | 707/206 |
| 2002/0194390 A1 | * | 12/2002 | Elving | 709/312 |
| 2004/0167945 A1 | * | 8/2004 | Garthwaite | 707/206 |
| 2005/0138623 A1 | * | 6/2005 | Fresko | 718/102 |
| 2005/0149585 A1 | * | 7/2005 | Bacon et al. | 707/205 |
| 2006/0064564 A1 | * | 3/2006 | Achanta et al. | 711/170 |

* cited by examiner

*Primary Examiner*—Stephen C. Elmore
*Assistant Examiner*—Daniel Kim
(74) *Attorney, Agent, or Firm*—Park, Vaughan & Fleming LLP

(57) ABSTRACT

A system and method for reducing the overhead involved in allocating memory to a task, thread or similar entity that shares memory or some other resource with other tasks or threads. A task is assigned a memory limit identifying a maximum amount of memory it may use at one time. When the task requires additional memory to store an object, it is granted a local allocation buffer if the size of the buffer plus the task's current memory allocation will not exceed the task's memory limit. Thereafter, memory space for objects is allocated from the task's local allocation buffer. This scheme avoids the overhead of constantly checking whether it has reached its limit, which is normally performed every time a task allocates memory. For large objects (e.g., greater in size than a local allocation buffer), memory may be allocated directly from the shared area.

18 Claims, 2 Drawing Sheets

SYSTEM AND METHOD FOR REDUCING ACCOUNTING OVERHEAD DURING MEMORY ALLOCATION

BACKGROUND

This invention relates to the field of computer systems. More particularly, a system and method are provided for reducing the overhead associated with memory allocation operations.

In multi-tasking computer systems, the amount of memory used by each task must be controlled. Without appropriate controls on memory allocation, a misbehaving task could appropriate large amounts of memory, thereby limiting the amount available to other tasks.

In many systems, each time a task requests additional memory, a determination is made as to how much memory is already allocated to the task. If its quota is exceeded, the new request may be denied.

However, determining a task's current allocation each time it requests additional memory creates significant overhead, which can degrade system performance. In particular, each time a task requests an allocation of memory from a shared area (e.g., a heap), several operations are required. Illustratively, a pointer separating allocated from unallocated space must be advanced, a test must be run to determine if a memory boundary was reached, the allocated area must be returned to the requester and a determination must be made as to whether the additional allocation would exceed the requestor's quota.

If this determination could be avoided for a substantial number of memory allocations, the cost of performing the allocations would decrease significantly. Thus, there is a need for a method of allocating memory to a task in a multi-tasking system without checking for the task's current allocation each time it requests additional memory.

SUMMARY

In one embodiment of the invention, a system and methods are provided for reducing the overhead involved in allocating memory to a task, thread or similar entity that shares memory or some other resource with other tasks or threads.

A task is assigned a memory limit identifying a maximum amount of memory it may use at one time. When the task requires additional memory to store an object, it is granted a local allocation buffer if the size of the buffer plus the task's current memory allocation will not exceed the task's memory limit. Thereafter, memory space for objects is allocated from the task's local allocation buffer. This scheme avoids the overhead of checking whether the task has reached its limit, which is normally performed every time a task allocates memory. For large objects (e.g., greater in size than a local allocation buffer), memory may be allocated directly from the shared area.

DETAILED DESCRIPTION

Figure 1:
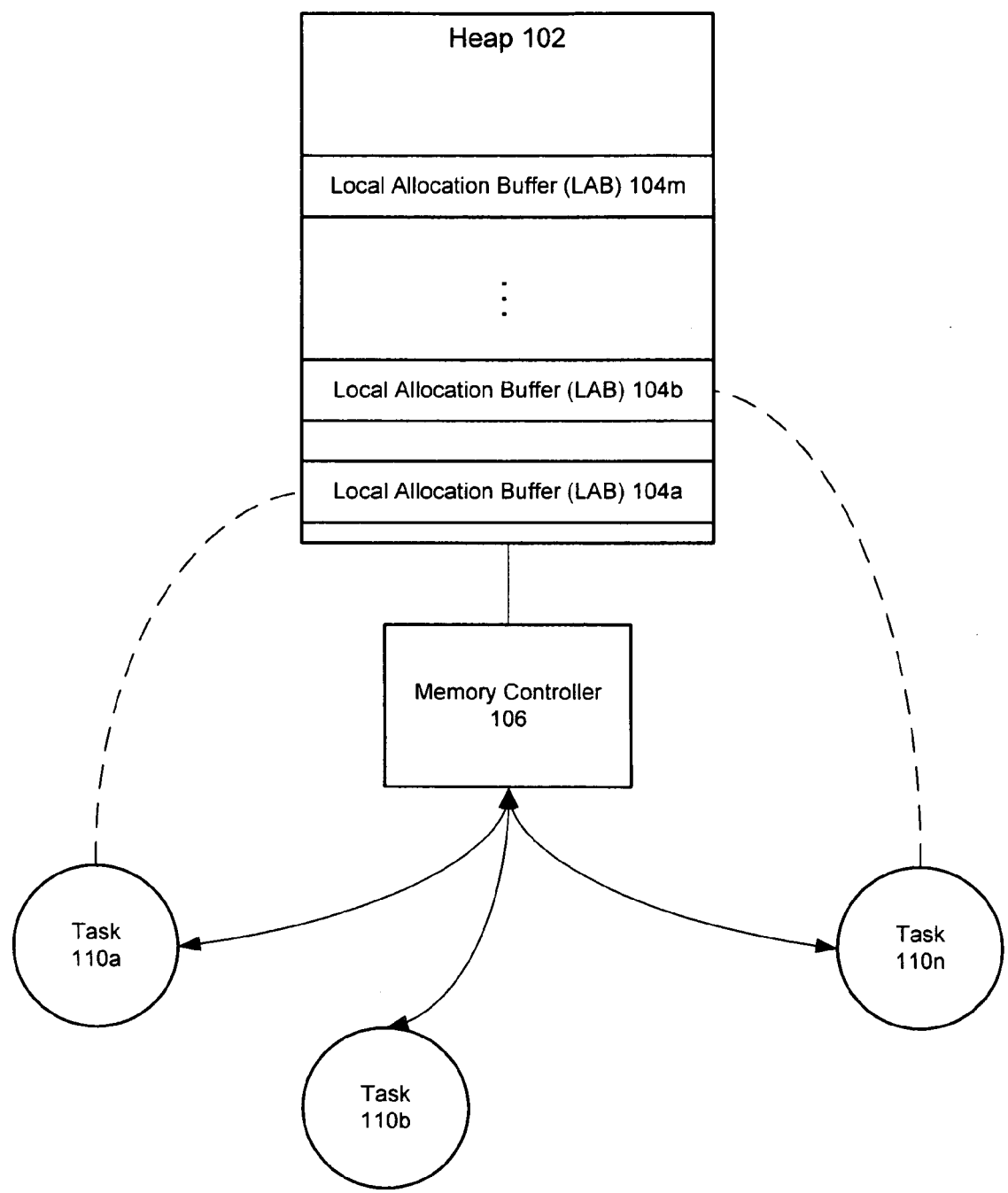
FIG. 1 is a block diagram depicting a multi-tasking environment in which an embodiment of the present invention may be implemented.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for a multi-tasking environment for eliminating the need to check for a current level of memory allocation each time a task needs to store an object in shared memory. In this embodiment, the method is implemented in a single- or multi-threaded operating system or environment, which may or may not support preemptive scheduling among tasks.

In general, tasks may be virtually any type of separate, concurrently executing computations or operations, and may share memory, disk space and/or other resources. They are separate software entities, but are not separated in terms of hardware support or the operating system. Thus, multiple tasks may be created within a single operating system process.

For example, an embodiment of the invention described herein may be implemented in a Java Virtual Machine (JVM). In this embodiment, a "task" may correspond to an isolate, as defined in JSR (Java Specification Request) 121, and the JVM may be a Multitasking Virtual Machine (MVM). In another embodiment of the invention, tasks may comprise separate threads within a single application process. Thus, tasks may share data structures amongst themselves.

The tasks allocate memory from a shared heap or other shared memory structure. For example, the shared structure may comprise a garbage-collected object heap in a JVM. The sequence or pattern of memory allocations among the tasks is irrelevant, but each allocation operation is logically atomic.

Although embodiments of the invention are described herein as they may be implemented to reduce overhead when allocating memory, other embodiments may be readily derived from these descriptions for other resource allocations.

In an embodiment of the invention, each task is assigned or associated with a threshold or quota representing the maximum amount of memory it may have in use at one time. When it needs memory (e.g., to store an object), a task is allocated a portion of the shared memory, in the form of a local allocation buffer (LAB). An LAB may be of virtually any size, but is preferably large enough to accommodate multiple objects of an average size. Thus, in a JVM in which the average object is approximately 40 bytes, an LAB may be approximately 4 Kbytes, thereby allowing approximately 100 objects of average size to fit in one LAB.

An initial LAB may be assigned to each task as it is created. In one embodiment of the invention, a task may be prevented from starting if there are no free LABs available.

The size of an LAB, other than possibly being larger than an estimated or computed average size, is not restrained. However, as will be clear from the following description, it may be efficient to limit the size of an LAB to a relatively small percentage of the size of the shared memory.

When a task requests or is to be granted a new LAB, a check is made as to whether the size of the LAB, when added to memory already allocated to the task, will exceed the task's threshold. If it would be exceeded, a more exact examination of the amount of memory allocated to the task may be performed. As long as the task's threshold is not exceeded, it can continue to receive additional LABs.

Once it has received an LAB, the task uses the buffer for storing objects instead of allocating memory directly from the shared memory. Thus, the LAB can be used without incurring the normal per-allocation cost of checking the task's memory limit.

Illustratively, each time a garbage collection is performed, a very accurate reading of the amount of memory allocated to each task is obtained. Thereafter, each task's reading is incremented by the LAB size each time a new LAB is allocated to the task. When a more exact examination of a task's current allocation is desired, a garbage collection may be performed, the examination may be postponed for a short period (e.g., until a garbage collection is performed) or a separate operation may be executed to determine the task's current allocation.

In one embodiment of the invention, when an examination of a task's current memory allocation reveals that granting it an additional LAB would cause it to exceed its threshold, the task is notified of a lack of memory in a customary manner. For example, in a JVM, the thread or isolate would experience an OutOfMemory exception.

FIG. 1 is a block diagram of a multitasking environment in which an embodiment of the invention may be implemented. In this environment, tasks 110*a*–110*n* share memory heap 102. As described above, tasks 110 may be separate isolates within a JVM, separate threads within a single application or operating system process, or some other collection of separate operations that share a resource.

Memory within heap 102 is allocated in the form of Local Allocation Buffers (LAB), but may also be allocated for individual objects. For example, when a task requires memory for an object that is larger than a threshold fraction or percentage of the size of an LAB (e.g., 50%, 75%), memory may be allocated directly from heap 102 instead of using an LAB. As shown in FIG. 1, LAB 104*a* is allocated to task 110*a*, while LAB 104*b* is allocated to task 110*n*.

Memory is allocated from heap 102 via controller 106. In this embodiment controller 106 is a mutex, allowing only one task at a time to allocate memory from the heap. However, in one implementation of this embodiment for a JVM, a distinct mutex controller may not be needed if the JVM is internally single-threaded, because there is no contention for memory allocation.

Until its current LAB is consumed, a task will allocate memory from that LAB for new objects. One or more pointers may be maintained in an LAB to track its free area. Each time an object is added to the LAB, a pointer may be increased and checked against an LAB boundary, to determine whether additional memory (i.e., another LAB) is needed.

In the illustrated embodiment of the invention, as long as each task stays within its preset memory limit, no task can be prevented from being able to allocate memory for an object because of another task's allocations.

In one embodiment of the invention, a task's memory limit may be dynamically adjustable. The task itself may be empowered to increase (or decrease) its limit, or such action may be taken by some other entity (e.g., memory controller 106 of FIG. 1). In a zero-sum scheme, a task's memory limit may only be increased if another task's limit is decreased commensurately.

Figure 2:
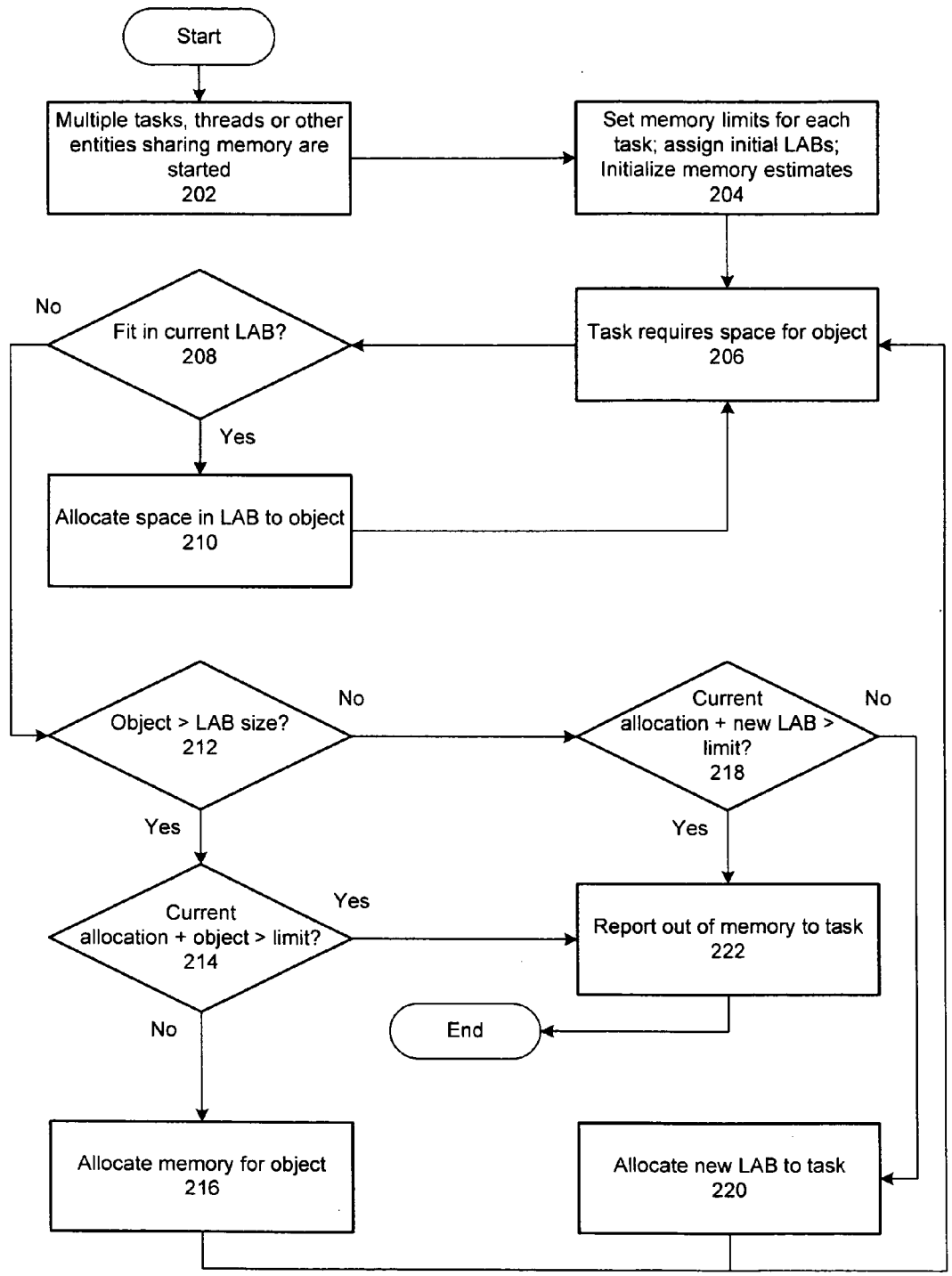
FIG. 2 is a flowchart illustrating one method of allocating memory via local allocation buffers, to reduce the overhead associated with memory allocation, in accordance with an embodiment of the invention.

FIG. 2 demonstrates one method of using Local Allocation Buffers (LAB) to reduce the overhead of allocating memory in a multitasking computing environment, according to one embodiment of the invention. In this embodiment, garbage collection may be performed, and may be compacting in nature or not compacting.

In operation 202, multiple tasks, threads or other operational entities are started in a Java Virtual Machine (JVM), an application process, an operating system process or other environment. The tasks share memory (e.g., a heap) and/or other resources.

In operation 204, memory limits are set for each task, to describe the maximum amount of shared memory that each task may use at one time. Different tasks may have different limits, and a given task's limit may be dynamic. Each task is allocated an initial LAB, which may be of virtually any size.

Also in operation 204, initial estimates are made of each task's current memory allocation. The initial estimates may be simply set to the size of the first LABs allocated to the tasks. Illustratively, operations 202–204 are performed for each new task created in the environment.

In operation 206, a task needs to create or store an object, which may be of virtually any size. The object may comprise data or executable instructions, and may comprise any type of data structure.

In operation 208, it is determined (e.g., by a memory controller) whether the object will fit into the task's current LAB. For example, the size of the object may be compared to the free space remaining in the LAB. If the object will fit in the LAB, the method continues with operation 210; otherwise, the method advances to operation 212.

In operation 210, memory is allocated for the object from the task's LAB. After operation 210, the illustrated method returns to operation 206 for a next object.

In operation 212, the object has been determined to be larger than the free space in the LAB. Therefore, an additional determination is made as to whether the object is larger than a new LAB. In other embodiments of the invention, this operation may, instead, examine whether the object is larger than a particular fraction or portion of a new LAB.

If the comparison in operation 212 succeeds (i.e., the object is larger than a new LAB), the method continues at operation 214. Otherwise, the method advances to operation 218.

In operation 214, it is determined whether space can be allocated for the object directly from the shared memory without exceeding the task's memory limit. In particular, if the size of the object plus the task's current allocation is greater than the task's limit, the method advances to operation 222. If, however, the sum of the task's current memory allocation plus the size of the object does not exceed the limit, the method continues with operation 216.

In operation 216, memory space for the object is allocated directly from the shared memory, rather than via an LAB. The task's estimated allocation is increased by the size of the object; the task's LAB remains in its current state. After operation 216, the method returns to operation 206 to handle another object.

In operation 218, the object will not fit into the task's current LAB, but is less than one LAB in size, and so a determination is made as to whether a new LAB can be allocated to the task without exceeding the task's limit. If the current memory allocation of the task plus the size of a new LAB exceeds the task's limit, the method advances to operation 222; otherwise, the method continues with operation 220.

In operation 220, a new LAB is allocated to the task. The estimate of space allocated to the task is increased by the size of the LAB. The method then returns to operation 206 to process a next object.

In operation 222, space for the object cannot be allocated to the task without violating the task's memory allocation limit. Therefore, in the illustrated embodiment of the invention, the allocation is denied and an out of memory error (or comparable error) is reported. In one alternative embodiment, the task's limit may be dynamically extended or increased to accommodate the object. In another alternative embodiment, operation 222 may trigger a garbage collection. After operation 222, the illustrated method ends.

In the method of the invention depicted in FIG. 2, decisions regarding whether a task would violate its memory limit are based on continually updated estimates. In another embodiment of the invention, described further above, a closer, more exact determination of the amount of memory allocated to a task is performed when it is estimated that a task may exceed its memory limit (e.g., as in operations 214 and 218).

This closer examination may comprise a compacting garbage collection process, after which an exact or nearly exact measure of the task's current memory allocation can be obtained. However, the scope of the invention is not limited to any particular processes or procedures for obtaining an accurate measure of current memory allocation of a task.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of allocating shared memory to isolates in a Java Virtual Machine (JVM), the method comprising:
    operating multiple isolates within a single JVM, wherein the isolates share a memory;
    for each isolate:
        assigning a memory limit identifying a maximum amount of shared memory usable by the isolate at one time;
        allocating a first local buffer to the isolate from the shared memory; and
        allocating space from the first local buffer for storing objects, without determining whether allocation of said space will cause the isolate to exceed its memory limit; and
    when a first isolate requires additional shared memory, estimating an amount of shared memory used by the first isolate.

2. The method of claim 1, wherein said allocating space comprises:
    identifying a first object to be stored in the shared memory for the first isolate;
    determining whether said first object will completely fit into the first local buffer allocated to the first isolate; and
    if said first object will fit into the first local buffer, storing said first object in the first local buffer without determining whether the memory limit of the first isolate will be exceeded.

3. The method of claim 2, wherein said allocating space further comprises:
    if said first object will not completely fit into the first local buffer, comparing a size of the first object to a size of a new local buffer.

4. The method of claim 3, wherein said allocating space further comprises:
    if the first object is larger than the new local buffer, determining whether the memory limit of the first isolate will be exceeded if memory is allocated for the first object;
    if the memory limit of the first isolate may be exceeded if memory is allocated for the first object, reporting an error; and
    if the memory limit of the first isolate will not be exceeded if memory is allocated for the first object, allocating memory for the first object directly from the shared memory.

5. The method of claim 3, wherein said allocating space further comprises:
    if the first object is smaller than the new local buffer, determining whether the memory limit of the first isolate will be exceeded if the new local buffer is allocated to the first isolate;
    if the memory limit of the first isolate may be exceeded if the new local buffer is allocated to the first isolate, reporting an error; and
    if the memory limit of the first isolate will not be exceeded if the new local buffer is allocated to the first isolate:
        allocating the new local buffer to the first isolate; and
        storing the first object in the new local buffer.

6. A computer readable medium storing instructions that, when executed by a computer, cause the computer to perform a method of allocating shared memory to isolates in a Java Virtual Machine (JVM), the method comprising:
    operating multiple isolates within a single JVM, wherein the isolates share a memory;
    for each isolate:
        assigning a memory limit identifying a maximum amount of shared memory usable by the isolate at one time;
        allocating a first local buffer to the isolate from the shared memory; and allocating space from the first local buffer for storing objects, without determining whether allocation of said space will cause the isolate to exceed its memory limit; and when a first isolate requires additional shared memory, estimating an amount of shared memory used by the first isolate.

7. A computer-implemented method of allocating memory to threads of an executing process, the method comprising:

executing a process on a computing device, wherein the process is granted hardware resources separate from hardware resources granted to other processes executing on the computing device;

spawning multiple threads within the process, wherein the multiple threads share the resources granted to the process, including memory;

for a first thread within the process:

assigning a memory limit identifying the maximum amount of the shared memory the first thread may be allocated; and allocating a first portion of the shared memory to the first thread as a first local buffer for use by only the first thread;

identifying a first object to be stored in the shared memory by the first thread; determining whether the first object will fit into the first local buffer; and if the first object will fit into the first local buffer, storing the first object in the first local buffer without considering said memory limit.

8. The method of claim 7, further comprising, if the first object will not fit completely into the first local buffer:

if the first object is smaller than a predetermined fraction of a new local buffer, determining whether the new local buffer can be allocated to the first thread without exceeding the memory limit; and if the new local buffer can be allocated to the first thread without exceeding the memory limit:

allocating the new local buffer to the first thread; and storing the first object in the new local buffer.

9. The method of claim 8, further comprising:

if the new local buffer cannot be allocated to the first thread without exceeding the memory limit, issuing an error.

10. The method of claim 8, further comprising:

if the new local buffer cannot be allocated to the first thread without exceeding the memory limit, initiating a garbage collection operation.

11. The method of claim 8, further comprising:

if the first object is larger than the predetermined fraction of a new local buffer, determining whether memory space for the first object can be allocated to the first thread from the shared memory without exceeding the memory limit; and if memory space for the first object can be allocated to the first thread without exceeding the memory limit:

allocating memory sufficient to store the first object to the first thread from the shared memory; and storing the first object.

12. The method of claim 11, further comprising:

if memory space for the first object cannot be allocated to the first thread without exceeding the memory limit, issuing an error.

13. The method of claim 11, further comprising:

if memory space for the first object cannot be allocated to the first thread without exceeding the memory limit, initiating a garbage collection operation.

14. A computer readable medium storing instructions that, when executed by a computer, cause the computer to perform a method of allocating memory to threads of an executing process, the method comprising:

executing a process on a computing device, wherein the process is granted hardware resources separate from hardware resources granted to other processes executing on the computing device;

spawning multiple threads within the process, wherein the multiple threads share the resources granted to the process, including memory;

for a first thread within the process:

assigning a memory limit identifying the maximum amount of the shared memory the first thread may be allocated; and allocating a first portion of the shared memory to the first thread as a first local buffer for use by only the first thread;

identifying a first object to be stored in the shared memory by the first thread;

determining whether the first object will fit into the first local buffer; and if the first object will fit into the first local buffer, storing the first object in the first local buffer without considering said memory limit.

15. An apparatus for efficient allocation of shared memory among software tasks, comprising:

a software process executing on a computing device, wherein the process has associated hardware resources separate from resources associated with other processes executing on the computing device;

multiple tasks created within the software process, wherein:

the tasks share the resources associated with the process, including a shared memory; and each task has an assigned memory limit identifying a maximum amount of the shared memory it may use;

within the shared memory, a plurality of local buffers, wherein:

each of the tasks is allocated one or more of the local buffers; and each task allocates memory for storing objects from a local buffer;

wherein a task's current memory allocation is compared to the task's assigned memory limit when a local buffer is to be allocated to the task, but not when the task allocates memory in the local buffer to store an object.

16. The apparatus of claim 15, wherein the software process is a Java Virtual Machine.

17. The apparatus of claim 16, wherein the tasks are isolates.

18. The apparatus of claim 15, further comprising a memory controller configured to:

track an amount of memory allocated to each task from the shared memory; and compare the amount of memory allocated to a task to the task's memory limit when a local buffer is to be allocated to the task.

* * * * *